United States Patent [19]
Delobelle et al.

[11] 4,067,373
[45] Jan. 10, 1978

[54] TIRES

[75] Inventors: Emile-Jean Delobelle, Colombes; Francois Madec, Puteaux, both of France

[73] Assignee: Pneumatiques Caoutchouc Manufacture et Plastiques Kleber-Colombes, France

[21] Appl. No.: 615,467

[22] Filed: Sept. 22, 1975

Related U.S. Application Data

[63] Continuation of Ser. No. 432,208, Jan. 10, 1974, abandoned.

[30] Foreign Application Priority Data

Jan. 10, 1973 France .............................. 73.00802

[51] Int. Cl.² .................... B60C 9/02; B60C 15/00
[52] U.S. Cl. .......................... 152/354 R; 152/362 R; 152/362 CS; 152/374; 152/DIG. 12

[58] Field of Search .................. 152/352–355, 152/357, 374, 362 R, 362 CS

[56] References Cited

U.S. PATENT DOCUMENTS

| | | | |
|---|---|---|---|
| 3,253,636 | 5/1966 | Travers | 152/354 |
| 3,508,595 | 4/1970 | Wilson | 152/353 R |
| 3,842,883 | 10/1974 | Masson et al. | 152/354 |

*Primary Examiner*—Drayton E. Hoffman
*Attorney, Agent, or Firm*—Craig & Antonelli

[57] ABSTRACT

A tire for a motor vehicle having a radial carcass and a top belt construction which includes a filler section in the lower portion or flange portion of each sidewall. The filler section is positioned between a portion of the carcass and folded over edges of the carcass and is comprised of a rubber material having a dynamic modulus at least about 200 kg/cm² and a relatively low hysteresis or a loss angle on the order of from about 7° to 13°.

9 Claims, 2 Drawing Figures

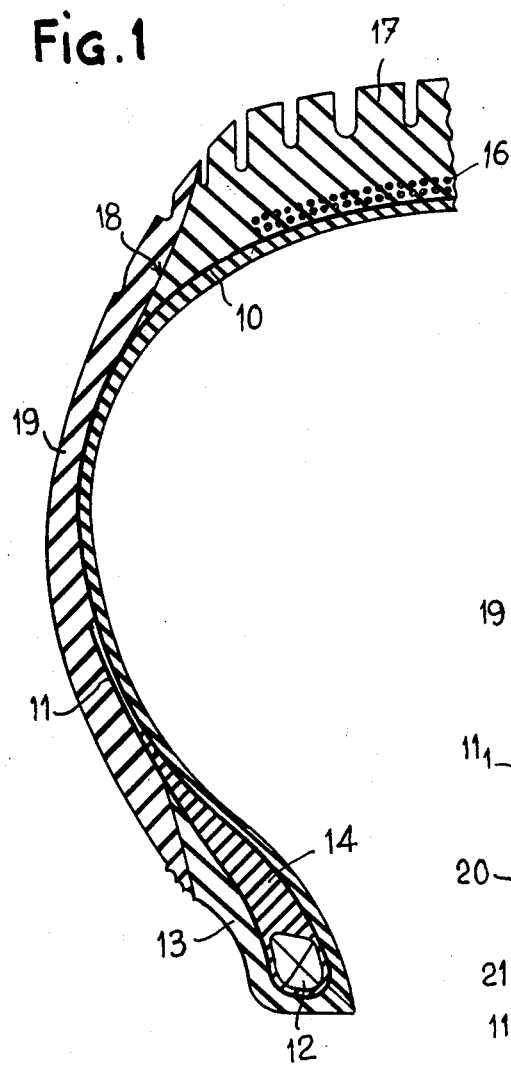
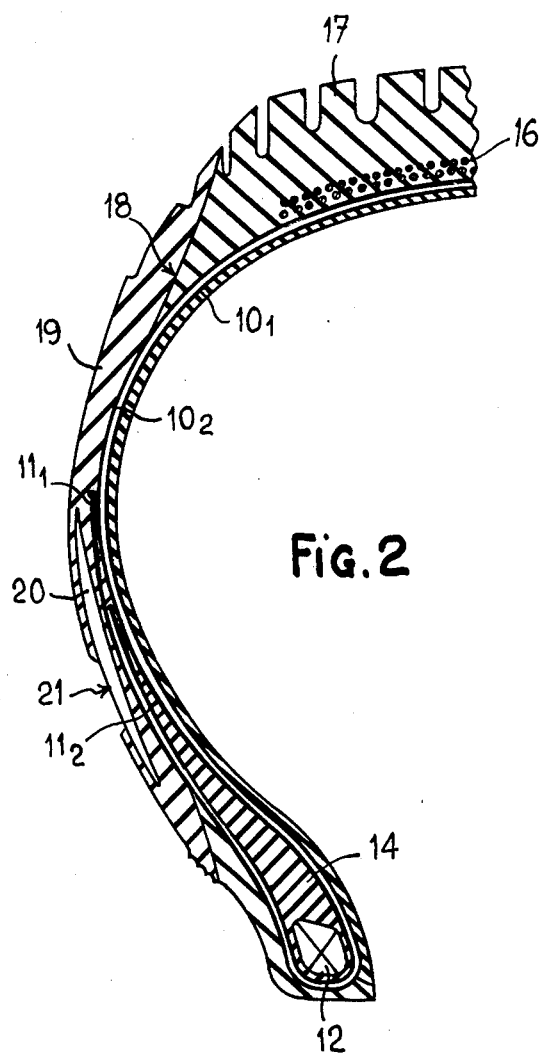

TIRES

This is a continuation of application Ser. No. 432,208 filed Jan. 10, 1974, now abandoned.

The present invention relates to improvements in tires of the type having a radial carcass construction and a top belt placed under the tread.

It is known in the art that tires of this type have a certain number of advantages, particularly a better resistance to wear, less resistance to advance, good road behavior, and good adherence to the ground.

It is equally known that, with respect to this type of tire, it is advisable to increase the transverse rigidity of the sidewalls in such a manner that the time of response of the tire to the direction-changing stresses or forces be as limited as possible, notably during driving at high speed. Toward this end it has already been proposed to stiffen the lower half of the sidewalls by means of reinforcements made from fabric, or by means of sections made from hard rubbers, localized in this region of the sidewalls. These stiffening means, however, are not fully satisfactory relative to this point of view; rather, they often complicate the manufacture of the tires by increasing the number of elements which have to be assembled in the course of the manufacture.

The present invention is directed to and concerned with an improved tire construction which allows for obtaining, in service, very short periods of response to the transverse stresses while the manufacture of the tire is nevertheless simple and not very costly.

This improved construction will now be further described hereinafter with reference to the accompanying drawings which illustrate, in a horizontal cross section, two embodiments of the present invention in FIGS. 1 and 2.

In FIG. 1, the tire comprises a radial frame or carcass 10 consisting of a single ply or stratum of cord fabric, either seamless or with a light seam, constituted of cables or cords made from rayon, nylon, polyester, or metal, oriented along the meridian planes of the tire. The edges 11 of this carcass 10 are each folded about the unit consisting of the bead 12 and the reinforced or filler section 14, and these folded edges are partially covered by the rim rubber 13 consisting of a rubber mixture resistance to the abrasion in order to support the friction of these portions of the tire against the flanges or edges of the wheel rim. The top of the carcass 10 is hooped or banded by a relatively rigid and circumferentially inextensible reinforcing belt 16 consisting, for example, of one or several pairs of "cord" fabric sheets or plies, being either textile or metallic, whose cables or cords form small angles in the order of 20° with respect to the equatorial plane of the tire. This belt 16 has a breadth or width approximately equal to the breadth or width of the tread, and it is covered by the tread 17 having an anti-skid profile appropriate to the use of the tire. Between the rim rubber 13 of the tire flanges and the edges of the tread 17 there extend sidewalls 19 with lower and upper edges that become progressively connected in a beveled fashion to the rim rubber 13 and to the exterior lateral edges of the sides 18 of the tread. These sidewalls 19 have the role of protecting the outer face of the carcass 10, and these walls are made from a relatively flexible rubbery mixture, that is to say that these walls have a Shore hardness A of approximately 60 and a medium modulus of elasticity in the order of 15 kg/cm$^2$ at 100% elongation.

For the purpose of increasing the transverse rigidity of the lower portion of the tire sidewalls, the filler section or reinforced section placed above the bead 12 is made from a rubbery mixture having a very high modulus of elasticity at small deformations, i.e. for example, a dynamic modulus in the order of about 200 to about 300 kg/cm$^2$ (the dynamic modulus being recorded in the course of a test in variable extension under a tension of 15% with an extension amplitude of 5% and a frequency of 7.5 hertz). This rubbery mixture displays, however, a relatively weak hysteresis, or a loss angle in the order of from about 7° to about 13° thereby expressing a good rubber elasticity. By way of comparison, the rubbery mixtures utilized customarily for the filler or reinforced sections such as the section or profile 14 have a dynamic modulus not higher than about 120 kg/cm$^2$, and when they display moduli in that order, they show, by contrast, i.e. with the conventional formulations, at a high sulfur content and with reinforcing fillers such as carbon black — a clearly higher hysteresis, or a loss angle in the order of from about 15° to about 16°.

With use of such filler sections 14 made from a rubbery mixture having at the same time a very high modulus of elasticity and a weak or low hysteresis, there is obtained a significant stiffening of the lower portion of the sidewalls with respect to lateral stresses, which is expressed in actual practice as a mean time or period of response of the tire to the lateral stresses that is clearly shorter than that obtained with sections made from a conventional-type hard rubber mixture, thereby exhibiting a better road behavior from the point of view of stability in a straight line, and a greater rapidity to reassume a proper course after a change in direction.

On the other hand, not only to enhance the manufacturing procedure, but also in order to avoid separations in the lower zone of the sidewalls, it is preferable that the ends of the folded-over edges 11 of the carcass be raised to the upper portion of the filler section 14, or even beyond, in a manner such that this section is completely enveloped between the carcass 10 itself and the folded-over edges 11.

Another advantageous consequence of the lateral stiffening of the sidewalls, obtained by use of the sections 14 having a very high modulus of elasticity and weak or low hysteresis, resides in that, in a specific tire construction, it is possible to reduce somewhat the rigidity proper of the belt without, however, increasing the deflection of the tire. Thus, in a construction normally using a belt consisting of four superimposed strata or plies made from rayon, it is possible to utilize, in the construction as proposed by the present invention, a belt consisting solely of two superimposed rayon plies. Likewise, in a tire construction which would normally use two belt plies or layers made of metallic cables, it is possible to use instead a belt made up of two plies from textile cables having a high tenacity, such as the so-called "fiber B" aromatic polyamide cables of the du-Pont de Nemours company which are well known. Thus it is possible, on the one hand, to increase the radial flexibility, and hence the comfort quality of the tire and, on the other hand, to simplify the construction and thus reduce the cost thereof.

In FIG. 2, the construction illustrated therein is comparable to that of FIG. 1, except that the carcass comprises two plies $10_1$ and $10_2$ whose edges $11_1$ and $11_2$ are folded over from the inside toward the outside around beads 12. The outer edge $11_1$ is preferably sufficiently large so as to completely envelop the section 14.

On the other hand, one of the sidewalls 19 comprises a band or section 20 made from white rubber, one portion 21 of which is bared or exposed by milling so as to form a tire with a white sidewall, i.e. a white-wall tire. In this type of tire, and when the elevated portions are high, it is preferable that the edges $11_1$ and $11_2$ be raised beyond the milled portion 21 in order to avoid weakening of this area.

Tests have been carried out with tires according to the constructions illustrated in FIGS. 1 and 2 in which the filler rubbers were made of a rubbery mixture displaying a dynamic modulus of 280 kg/cm$^2$ and a loss angle of 10° for the purpose of measuring the mean times or periods of response to the direction-changing stresses applied to the tires. The results were compared with those obtained with tires of standard construction wherein the filler sections, associated with narrow stiffening sections were made from a rubber mixture having a dynamic modulus of 120 kg/cm$^2$ and a loss angle of 15°. For the standard tires, the mean time or period of response was 210 milliseconds; whereas it was reduced to 160 to 180 milliseconds for the tires made according to the present invention. The tire of this invention also showed a better comfort quality.

In order to obtain filler sections 14 with a very high modulus of elasticity and weak or low hysteresis, it is possible to utilize particularly rubbery mixtures charged at the same time with carbon black and with a polyolefin having a very high molecular weight equal to or greater than about 500,000. Such mixtures contain from about 50 to about 90 parts of carbon black and from about 20 to about 50 parts of polyethylene or polypropylene having a high molecular weight for 100 parts by weight of natural or synthetic elastomer of the type used for tires, allowing for obtaining the required modulus and hysteresis values. It is also possible to add to these mixtures short fibers, such as fine cut fibers of nylon, glass, or cotton, so as to obtain the very high moduli being desired.

While the novel principles of the invention have been described, it will be understood that various omissions, modifications and changes in these principles may be made by one skilled in the art without departing from the spirit and scope of the invention.

What is claimed is:

1. A tire of the type having a radial carcass and a top belt for vehicles, which comprises a tread, sidewalls and beads, each flange portion of a sidewall having a filler section made from a hard rubber material surmounting the bead, said filler section being positioned between a portion of the carcass and folded-over edges of the carcass and comprising a rubbery material which is a rubbery mixture containing for 100 parts of natural or synthetic elastomer, from 50 to 90 parts of carbon black and from 20 to 50 parts of polyethylene or polypropylene having a high molecular weight of at least 500,000, said rubbery material having at the same time a dynamic modulus of at least about 200 kg/cm$^2$ and a low hysteresis expressed by a low loss angle on the order of from about 7° to 13° and said sidewalls each having an exterior portion extending from a rim portion of the tire to the exterior lateral edges of the sides of the tread, each portion comprising a non-reinforced flexible rubbery material having a Shore hardness A of approximately 60 and a medium modulus of elasticity on the order of 15 kg/cm$^2$ at 100% elongation.

2. A tire according to claim 1, in which the edges of the carcass are folded over from the inside toward the outside in such a manner as to be raised above an upper edge of the filler section up to about one-half of the height of the sidewall of the tire.

3. A tire according to claim 2, in which at least one sidewall comprises a band of rubber in white color and in which the folded-over edges of the carcass extend between the band and the filler section.

4. A tire according to claim 3, in which the filler section extends upwards from the bead to a position at least about one-third the height of the sidewall.

5. A tire according to claim 1, in which the filler section is at least partially encompassed by said portion of said carcass and the folded-over edges of said carcass.

6. A tire according to claim 1, in which said carcass is made up of at least one ply of cords or cable oriented along the meridian planes of the tire.

7. A tire according to claim 1, in which a portion of the filler section is covered with a rim rubber material resistant to abrasion.

8. A tire according to claim 1, in which the filler section extends upward from the bead to a position at least about one-third the height of the sidewall and the folded-over edges of the carcass are turned up around the bead from the inside toward the outside in such a manner as to be raised above an upper edge of the filler section.

9. A tire according to claim 1, in which each flange portion of a sidewall has a single filler section comprised of said rubbery material.

* * * * *